R. A. SALE.
DUMPING CART.
APPLICATION FILED JUNE 15, 1921.
1,425,698.
Patented Aug. 15, 1922.
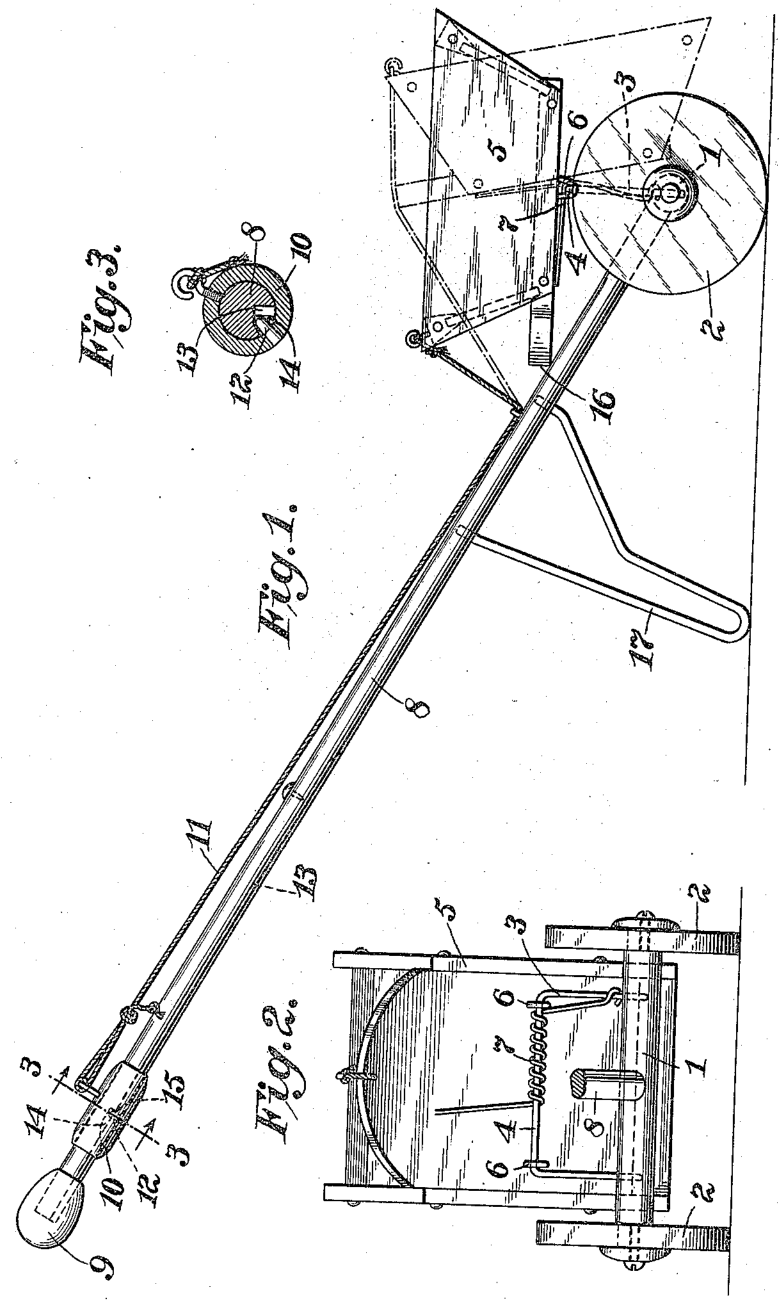
Inventor:
Robert A. Sale,
by Spear, Middleton, Donaldson & Hall
Attys.

UNITED STATES PATENT OFFICE.

ROBERT A. SALE, OF PHILADELPHIA, PENNSYLVANIA.

DUMPING CART.

1,425,698. Specification of Letters Patent. Patented Aug. 15, 1922.

Application filed June 15, 1921. Serial No. 477,782.

*To all whom it may concern:*

Be it known that I, Robert A. Sale, a citizen of the United States, and resident of Philadelphia, in the county of Philadelphia and State of Pennsylvania, have invented certain new and useful Improvements in Dumping Carts, of which the following is a specification.

This invention relates to toys and more particularly to children's dumping carts.

The object of this invention is to produce a cheap, attractive toy which may be used by a child to carry small objects, and which may be dumped with the least amount of effort on the part of the user.

With these and other objects in view, the invention consists in a cart provided with a body upon which a spring continually acts to dump the same, but which is locked against such action by means readily operable by the user.

In the drawing:—

Figure 1 is a side elevation of a preferred form of my device.

Fig. 2 is a front elevation of Fig. 1, showing the cart body in the dumped position.

Fig. 3 is a sectional view along the line 3—3 of Fig. 2.

Referring now more particularly to the drawing, wherein like characters of reference designate like parts throughout the views, the improved device consists of an axle 1 upon which is mounted wheels 2 in the usual manner. Suitably supported above the axle, as by means of auxiliary axle 3, socketed in axle 1, is a body 5 of any desired design, secured to the horizontal portion 4 of this axle.

This auxiliary axle is adapted to be secured to the bottom of the body in any manner which will allow the body to rotate to a degree about the same, as by staples 6.

Encircling the horizontal portion 4 of the auxiliary axle is a coiled spring 7 having one end engaging the portion 3 and the other engaging the bottom of the body, so that the tendency of the spring is to rotate the body about the axle 4 as a pivot, thereby giving the dumping effect.

A handle 8 socketed in axle 1 extends upwardly therefrom and may contain a knob 9 at the top thereof as an aid to the child in grasping the handle. A backwardly extending portion of the body engages the handle, as at 16, and prevents the body from reverse rotation. Below this knob and encircling the handle is a slidable member 10 having flexible means, as a piece of string or cord 11, which connects the body 5 therewith. As long as the member 10 remains at the limit of its upward movement, the cord 11 will prevent the spring 7 from dumping the body. Any suitable means may be employed to lock member 10 in its upward position, but I have shown in Fig. 3 member 10 provided with a boss 12 which travels in longitudinal recess 13 in the handle. This slot, however, is provided with an enlargement 14 at its upper end which when member 10 is partially rotated allows the boss to engage a shoulder 15 in this enlarged portion, and at right angles to the handle, and effectually prevents the tipping of the cart.

A support 17 may be provided attached to the handle portion for maintaining the body in a horizontal position without the assistance of the child.

What I claim is:—

1. A dumping cart including a body, tension means exerting pressure upon the body, tending to cause the same to rotate, means restraining the tension means from acting, an axle above which said body is mounted, and an auxiliary axle carried above the first axle and supporting the body, said tension means comprising a coiled spring encircling said auxiliary axle.

2. A dumping cart including a body, tension means exerting pressure upon the body, tending to cause the same to rotate, and means restraining the tension means from acting, a handle for pulling said cart, said restraining means including a member carried by said handle.

3. A dumping cart including a body, tension means exerting pressure upon the body, tending to cause the same to rotate, and means restraining the tension means from acting, a handle for pulling said cart, said restraining means including a member carried by said handle and encircling the same.

4. A dumping cart including a body, tension means exerting pressure upon the body, tending to cause the same to rotate, and means restraining the tension means from acting, a handle for said cart, said restraining means including a member carried by said handle and slidably engaging the same.

5. A dumping cart including a body, tension means exerting pressure upon the body, tending to cause the same to rotate, and means restraining the tension means from acting, a handle for said cart, said restraining means including a member carried by said handle and sildably engaging the same, and being provided with a boss riding in a longitudinal recess in said handle.

6. A dumping cart including a body, tension means exerting pressure upon the body, tending to cause the same to rotate, and means restraining the tension means from acting, a handle for said cart, said restraining means including a member carried by said handle, said handle having a longitudinal slot therein, said slot having an enlargement providing a shoulder transversely of said handle.

In testimony whereof I affix my signature.

ROBERT A. SALE.